Oct. 27, 1942.   C. H. YOUNG   2,300,191
RADIAL MULTIPLE EXPANSION STEAM ENGINE
Filed Oct. 27, 1937   3 Sheets-Sheet 3
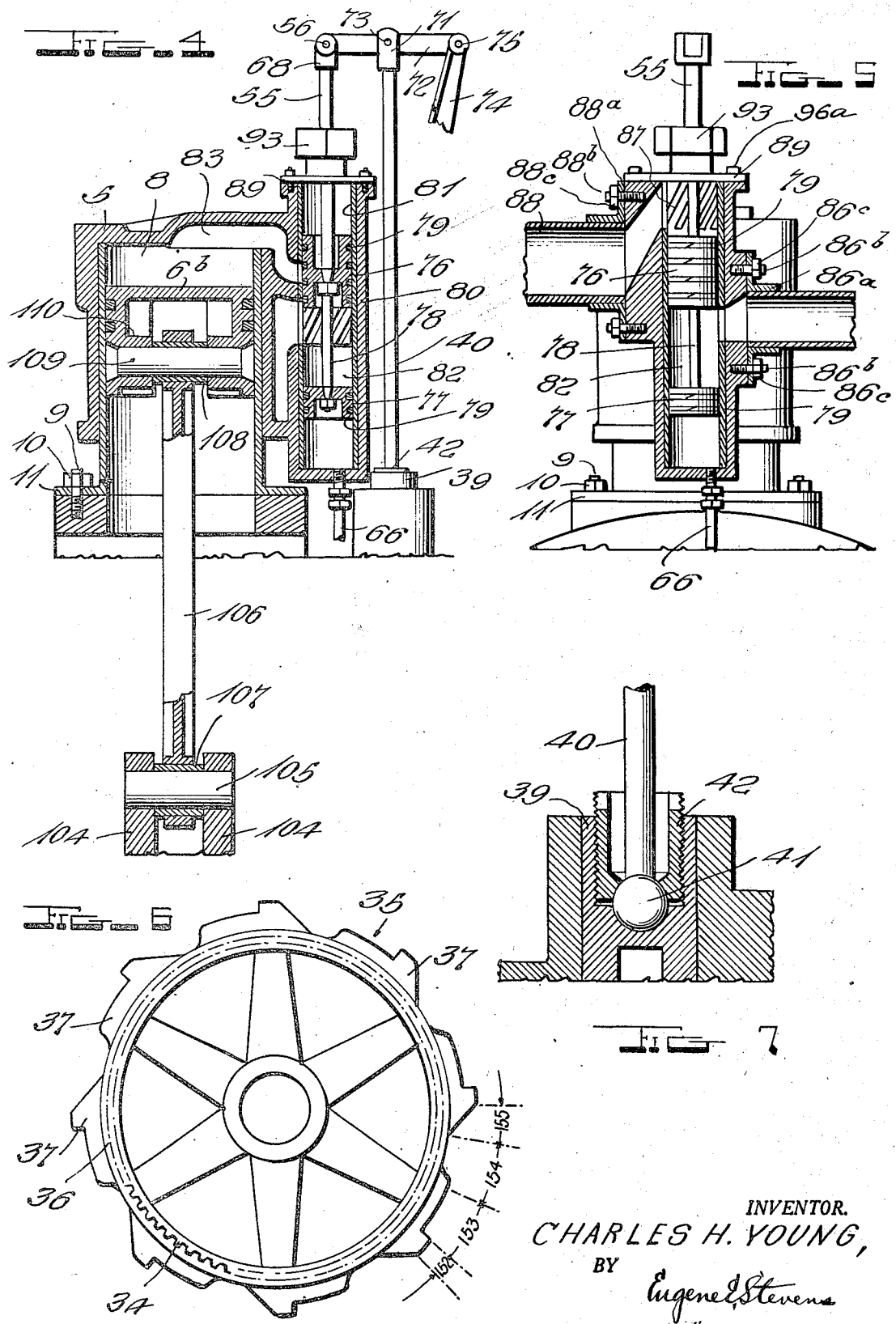
INVENTOR.
CHARLES H. YOUNG,
BY Eugene E. Stevens
His ATTORNEY Patented Oct. 27, 1942

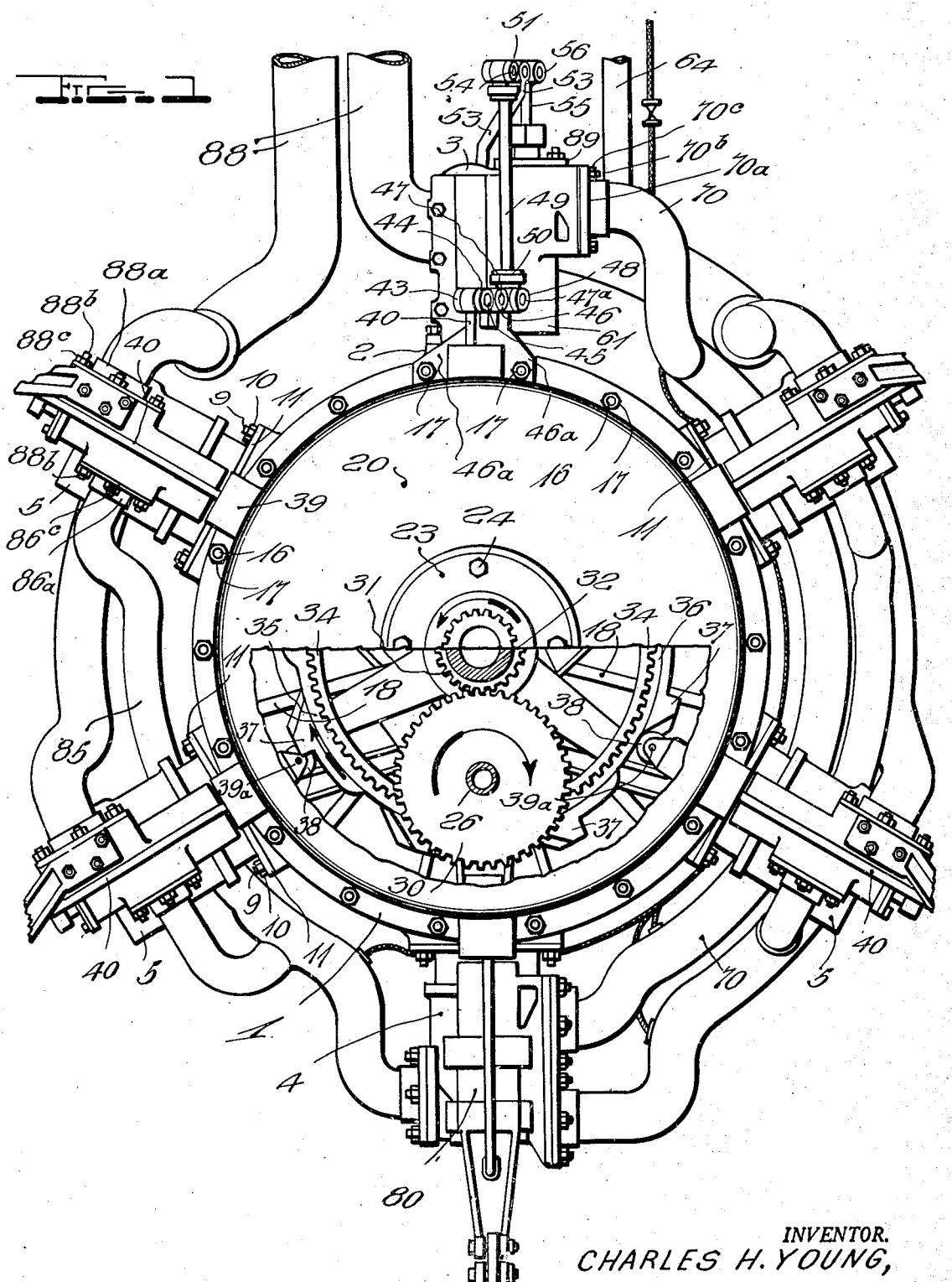

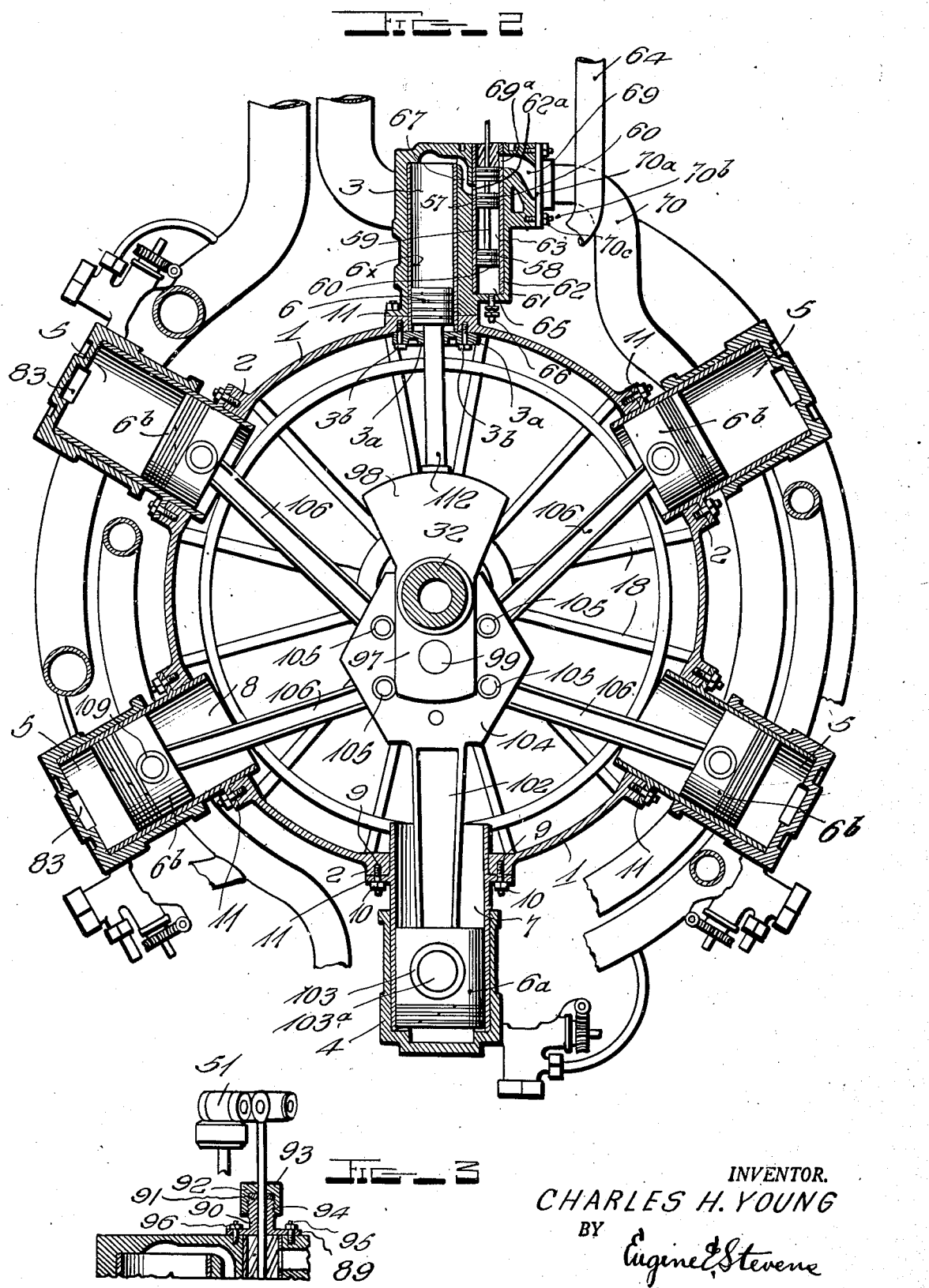

2,300,191

UNITED STATES PATENT OFFICE 2,300,191

RADIAL MULTIPLE EXPANSION STEAM ENGINE

Charles H. Young, Stockton, Calif.

Application October 27, 1937, Serial No. 171,265

3 Claims. (Cl. 121—102)

My invention relates to improvements in multiple expansion steam engines of the radial type and the like.

The invention has for its primary object to provide an improved power machine of the class set forth which is simple of design, efficient, durable, light weight and relatively inexpensive of manufacture and having a flexible power range and utilizing a minimum amount of space.

Other objects and advantages of the invention reside in the novel combination and arrangement of parts, mode of operation, etc., which will become more apparent as the description proceeds; reference being had to the accompanying drawings which form a part of this specification and in which:

Figure 1 is an end elevation of the engine, with a part of the casing removed.

Figure 2 is substantially a central transverse section therethrough.

Figure 3 is a fragmentary section illustrating assembly details at the top of the high pressure cylinder.

Figure 4 is a section through the low pressure steam cylinder and valve.

Figure 5 is a section similar to Figure 4 but at right angles thereto.

Figure 6 is an elevation of the valve actuating cam.

Figure 7 is a section, partly in elevation, illustrating a connection in the valve assembly.

Referring specifically to the drawings wherein the same reference characters designate the same parts in all views:

The engine comprises the annular cylinder housing 1, having cylinder pads 2, to which are attached the high pressure cylinder 3, the intermediate pressure cylinder 4, and the low pressure cylinders 5 by the annular cylinder liners 6x, 7 and 8 which are held by the studs 9 and nuts 10 being screwed down on the cylinder liner flanges 11.

The annular cylinder housing 1, has fastened on each and, a roller bearing housing which houses roller bearings for the crank shaft 32.

The roller bearing housings are clamped to the annular cylinder housing 1 by the studs 16 and the nuts 17, the latter being set up tight on the flanges of the thrust bearing housing 20 and the accessories housing not shown. The roller bearing housings are reinforced with ribs 18 which stiffen and add strength to the housing members.

The thrust bearing housing 20 houses the crank shaft roller bearing, which is held in place by the roller bearing retainer 23. The latter is fastened to the housing 20 by the cap screws 24.

The bearing housing 20 also houses a roller bearing which supports one end of the jack shaft 26. The other end of the jack shaft 26 is likewise supported by a roller bearing.

The jack shaft 26 has fastened to it the spur gear 30, which is driven by the pinion 31. The latter is driven by the crank shaft 32. A spur gear, not shown, which is an integral part of the jack shaft 26, meshes with and drives the internal spur gear 34, which drives the cam wheel 35, having on its periphery the cam ring 36 and the plurality of cams 37.

The cam followers 38 roll on the cams 37 and are fastened to the cam follower guides 39 by the cam follower pins 39a. The housing valve crank rod 40 is fastened to the cam follower guide 39 by the ball joint 41 and the ball ferrule 42.

For operating the high pressure piston valve 57, the housing valve crank rod 40 has fastened to one end the fork connection 43 to which is fastened the bell crank 44, by the pin 45.

The fork bracket 46 fastened to the flange of the bearing housing 20 by the flange 46a and nut 17, has a pin 47 on which the bell crank 44 is fulcrumed.

The bell crank 44 has its other end forked 48, to which is fastened one end of the valve stem crank rod 49, by the pin 47a. The ball and socket joint 50 compensates for the valve stem crank rod 49 being out of alignment for various positions of the bell crank 44.

The valve stem crank 51 is supported by the valve crank bracket 53, which is fastened to the high pressure cylinder head. The valve stem crank 51 is fulcrumed on the pin 54. One end of the valve stem crank 51 is fastened to the end of the valve stem 55 by the pin 56. The other end of the valve stem 55 is connected to the piston valve assembly made up of the high pressure piston valve 57 and vacuum piston 58. A space between these two units forms the steam chamber 63, and they are connected together by the rod 59. The high pressure piston valve 57 and vacuum piston 58 have packing rings 60 which provide a steam-tight joint.

The high pressure piston valve cylinder consists of the cylinder 61, having the valve cylinder liner 62. Steam is admitted to high pressure port 67 through opening 62a in the valve cylinder liner 62. Exhaust steam flows into the exhaust port 69 through opening 69a in cylinder liner 62. Boiler pressure steam enters steam chamber 63 through an opening not shown. The high pressure fluid supply pipe 64 connects the engine with the boiler.

The vacuum chamber 65 is in communication with a vacuum pump by the vacuum pipe 66. The vacuum pump of the usual type is not shown. This insures a high vacuum being maintained in the vacuum chamber 65.

The steam port 67 provides a steam passage between the steam chamber 63 and the high pressure cylinder 3 when the port is uncovered. The exhaust port 69 provides a steam passage for the exhaust steam to the exhaust pipe 70.

For operating the intermediate pressure piston valve and low pressure piston valve, the valve rod 40 has fastened to its outer end the fork connection 71, which fits over the bell crank 72 and is fastened to it by the pin 73. One end of the bell crank 72 is held by the bracket 74 and the pin 75, on which it is fulcrumed. The bracket 74 has a flange connection to the valve cylinder 80. The other end of the bell crank 72 is fastened to the valve stem 55 by the pin 56 and fork connection 68.

The end of the valve stem 55 is fastened to the intermediate pressure piston valve, consisting of the piston valve 76 and the vacuum piston 77. Steam chamber 82 is formed between the two pistons which are separated by the rod 78. The piston valve 76 and the vacuum piston 77 have packing rings 79 for making a steam tight joint. The vacuum chamber 86 communicates with the vacuum pipe 66, and with a vacuum pump. The latter is not shown on the drawings.

The intermediate pressure piston valve cylinder 80 and the low pressure piston valve cylinders have liners 81.

The steam chamber 82 between the piston valve 76 and the vacuum piston 77 of the intermediate pressure cylinder is supplied with steam which has been exhausted from the high pressure cylinder 3 by the intermediate pressure fluid supply pipe 70 which is the exhaust pipe from the high pressure cylinder 3. The intermediate cylinder pressure fluid pipe 70 has flange connection 70a, studs 70b and nuts 70c for fastening this pipe to the respective cylinders.

The steam port 83 provides a passage between the chamber 82 and the intermediate pressure cylinder 4 when the piston valve 76 uncovers the steam port 83 for steam admission. This also applies to the 4 low pressure cylinders.

The exhaust ports, not shown, communicate with the exhaust pipes 85. The intermediate pressure cylinder fluid exhaust pipe 85 is the pressure fluid supply pipe to the low pressure cylinders 5 and connects with the low pressure chamber 82 by the flange fitting 86a, studs 86b and nuts 86c. The low pressure exhaust port connects with the low pressure exhaust pipe 88, which is held by the flange connection 88a, studs 88b and nuts 88c. This exhaust pipe connects with an oil separator and condenser not shown in the drawings.

All piston valve cylinders have covers 89 each of which has a stuffing box 90 and valve rod packing 91 which is compressed by the gland 92 by the tightening down of the stuffing box gland nut 93 when screwed down over the screw threads 94. The covers 89 are held in place by the stud 95 and the nut 96 or the filister head screw 96a for the low pressure cylinders.

The high pressure cylinder 3 has a cylinder cover 3a which is fastened to the annular cylinder housing 1 by the filister head screws 3b.

The crank shaft 32 consists of the crank webs 97 which carry counterbalancing weight 98 and crank pin 99. The crank pin bearing, not shown, is constructed on the crank end of the master rod 102. On the other end of the master rod 102 is the wrist pin bearing 103, which bears on the wrist pin 103a, the latter being secured to the intermediate pressure piston 6a.

The crank pin bearing end of the master rod is constructed with two separated cheeks 104 for holding the articulating rod crank end pins 105 and provides a space between the cheeks for the articulating rod bearing 107 which bears on the articulating rod pin 105. The articulating rods 106 of the low pressure cylinders consist of the crank end bearings 107 and the piston end which has a bearing 108 which is fitted to the wrist pin 109, the latter bearing on the boss 110 of the low pressure pistons 6b.

In the high pressure cylinder 3 the piston 6 is fastened to the piston rod 112 in the usual manner.

The cams 37 provide a cam for each cylinder to take care of the required cycle of operation of the different valve positions corresponding to the various piston positions. The cam follower 38 travels over space 152 of the cam 37 for steam admission, over space 153 of the cam 37 for steam expansion, over space 154 of the cam 37 for steam exhaust, and over space 155 of the cam 37 for steam compression.

The operation of the engine is as follows:

Elevated pressure superheated steam flows from the boiler through the high pressure steam pipe 70 to the high pressure steam chamber 63. Assuming that the high pressure piston 6, has come to the end of the exhaust stroke and starts on the power stroke, the cam follower 38 is on the high point on the cam 37 and travels over the space 152 during which time the high pressure piston valve 57 actuated by the valve stem 55, the cam 37 and cam follower 38 through the valve gear causes the piston valve 57 to uncover the steam port 67, permitting steam to flow from the steam chamber 63 to the high pressure cylinder 3 and exert its pressure on the high pressure piston 6. With the point of cut-off is reached, the cam follower 38 falls to position for expansion, Figure 7, and causes the valve gear to act on the piston valve 57, closing the port 67. A quick cut-off of the steam is accomplished by the action of the vacuum piston 58 receiving the steam pressure on one side, plus atmospheric pressure due to the vacuum maintained in the vacuum chamber 65, which causes the cut-off to take place instantly. The remaining stroke of the high pressure piston 6 is accomplished by the expansion force of the steam being exerted against the high pressure piston 6.

A quick cut-off is very desirable in steam engines, as it eliminates wire drawing of the steam and increases the efficiency of the engine.

At the end of the power stroke, release occurs and the cam follower 37 falls down to position for exhaust. This position of the cam follower 37, as in the case of the cut-off, occurs instantly, being accomplished as before by the action of the vacuum piston 58. This position covers the space of the cam 154. In this position, the high pressure piston valve 57 has uncovered the port 67 and the exhaust steam flows over the top of the high pressure piston valve 57 into the exhaust chamber 69a, through the exhaust port 69, into the exhaust pipe 70, the latter also being the steam supply pipe for the intermediate pressure cylinder. Before the high pressure piston 6 reaches the end of the stroke, the piston valve covers the port 67, and the remaining steam in the cylinder is trapped and compressed by the piston 6. This forms a cushion for the reciprocating parts when passing over the top center.

After the steam has performed work in the high pressure cylinder 3, the pressure of the steam drops, as it is required that the intermediate pressure cylinder 4 shall do the same amount of work as the high pressure cylinder 3. It has to have a greater area due to the difference in pressure of the steam, i. e.: boiler pressure to that of exhaust pressure, that both the high pressure cylinder 3 and the intermediate pressure cylinder 4 may both perform an equal amount of work. The valve cycle of operation is identically the same for the intermediate pressure piston valve as described above.

The exhaust steam from the intermediate pressure cylinder 4 flows through the exhaust pipes 86 which are the steam supply pipes for the low pressure cylinders 5. The steam on being released from the intermediate pressure cylinder 4, has undergone another drop in pressure with an increase in volume which requires an increase in the area of the low pressure cylinders 5 so that the work performed by each cylinder will be equal.

If only one low pressure cylinder were used, its size would be out of proportion in relation to the rest of the cylinders. To overcome this disadvantage, the required area of the low pressure cylinder is provided by utilizing a plurality of low pressure cylinders, their combined area being equal to that of one large low pressure cylinder. Using a plurality of low pressure cylinders also distributes more evenly the power impulses acting on the crank end of the master connecting rod 102 and on the crank pin 99. The placing of the high pressure cylinder and the intermediate cylinder opposite each other, balances these forces.

The cycle of the low pressure piston valve operation is identically the same as the performance of the high pressure piston valve 57 and the intermediate pressure piston valve 76. The exhaust from the low pressure cylinder flows into the low pressure exhaust pipe 88 through an oil separator not shown on the drawings, to the condenser and the condenser air pump and the hot well. The latter are not shown as they are conventional and thoroughly understood by those familiar with steam power plant apparatus.

It will be noticed by reference to the detail drawing of the cam wheel 35, that the cam rings 37 have an irregular continuous surface. In practice the speed ratio of the cam wheel 35 to that of the crank shaft 32 will be of such a ratio that the cam motion transmitted through the valve gear will cause the steam valve to control the steam supply in proper relation to the various positions of the cylinder pistons.

The pistons 6, 6a and 6b will make two strokes during the time the crank pin 99 makes one revolution. The travel of the cam rings 37 for one revolution of the crank pin 99 is represented by the positions 152, 153, 154, and 155. This is a small fraction of the revolution of the crank pin 99. This reduction of speed of the cam rings 37 is very necessary in high speed engines, making possible the transmission of the cam motion to the valve gear operating the steam valves as well as eliminating excessive noise and inertia.

Each valve gear assembly is operated by its individual cam which insures a continuous positive motion being transmitted to the valve gear. It will be observed by reference to the drawings that the periphery of the cam rings 37 are a succession of irregular contours which gives the variable motion to the cam follower 38, which motion is transmitted to the steam valves.

The reduction of speed of the cam ring is accomplished by the crank shaft pinion 31 driving the spur gear 30 on the jack shaft 26 which drives a pinion, not shown, that in turn drives the internal spur gear 34. The latter is fastened to the cam wheel.

It will be seen by reference to the drawings that the action of the vacuum piston 58 or 77 exerts a constant force on the cam follower 38 through its connections, holding the latter to their respective seats on the surface of the cam rings 37. This is possible due to the manner of mechanical assembly between the cam follower 38 and the vacuum piston 58 or 77 and as explained hereinbefore, the action of the steam pressure plus atmospheric pressure gives a positive motion applicable to the operation of the steam valves 57, 76.

In the drawings the vacuum pistons 58 or 77 for convenience in drawing are shown as the same diameter as that of the steam piston valves 57 and 76. In practice it may be required to increase the diameter of the vacuum pistons 58 or 77 which can be done without departing from the spirit or scope of the invention.

In practice the addition of lift rod springs not shown on drawings, on the valve rods operating in conjunction with the action of the vacuum cylinders and vacuum pistons is feasible and would make the operation of the valves more positive in case of leakage or loss of vacuum in the vacuum cylinder. As springs are now universally used in other types of engines, their application would not constitute any new invention.

The direction of rotation of the shafts is indicated by the arrow headed arc.

The drawings show this construction applied to a single acting engine, but the arrangement is admirably adapted for application to a double acting engine. In the adaptation to the double acting engine, the cylinder cover of the crank end would be provided with piston rod, stuffing box, stuffing box gland, and gland nut which would provide a steam-tight construction for the crank end of the cylinder.

The drawings show the application of the piston valves and their operating devices as applied to a single acting engine. The valve chambers can be arranged on either side of the cylinders or at right angles to each other.

In practice it may be found that where a double acting engine is designed for the development of a certain horse power, in comparison with the same horse power of a single acting engine, that the cylinder diameters or bore of the various cylinders of a double acting engine would be of a very small diameter or bore, which would require the utilization of the novel construction of the connecting rod assembly and piston as described hereinbefore for the high pressure cylinder and which may be applied to all cylinders, and is also applicable to the master connecting rod.

The drawings show the master connecting rod applied to the intermediate pressure cylinder, but this unit of the engine may be applied to any of the other cylinders, giving the same results.

From the foregoing it is apparent that this engine is simple, very efficient, practical, utilizes a small amount of space for the amount of power output and having a small ratio of weight to the horse power output.

The efficiency of this engine as a power unit in elevated pressure work will be found to be high and will compete favorably with steam turbines in power units less than two thousand horse power.

I do not confine myself to any particular kind of materials, and it may be necessary to vary the construction from time to time which will enable the device being constructed in the most practical way without in any way departing from the scope or spirit of the invention. Having thus described the invention, what is claimed as new and useful and which I desire to secure by Letters Patent is:

1. In a steam engine of the class described, a valve mechanism comprising, a valve cylinder having a vacuum chamber at one end and a cover plate at the other end and formed with ports to be controlled, a valve means reciprocable in said valve cylinder having a valve piston for controlling said ports, a vacuum piston subjected to the vacuum in said vacuum chamber and a rod connecting said pistons, and valve operating means comprising a rotatable cam, a cam follower slidably guided and engaging said cam, a first pivoted lever, means connecting one end of said lever to said follower, a second pivoted lever, means connecting one end of said second pivoted lever to the other end of said first pivoted lever, said means including a ball and socket joint at the point of connections to the pivoted levers and a valve actuating rod passing through said cover plate connecting the other end of said second pivoted lever to said valve piston, whereby said vacuum in said vacuum chamber creates a bias on said valve means to cause motion of said valve means in one direction and whereby said cam causes motion of said valve means in the opposite direction.

2. In a steam engine of the class described comprising, a valve cylinder having a vacuum chamber at one end and a cover plate at the other end and formed with ports to be controlled, a valve means reciprocable in said valve cylinder having a valve piston for controlling said ports, a vacuum piston subjected to the vacuum in said vacuum chamber and a rod connecting said pistons, valve operating means comprising a rotatable cam, a cam follower engaging said cam, a valve actuating rod passing through said cover plate and connected to said valve piston, and a positive operating connection between said cam follower and valve actuating rod, whereby vacuum in the vacuum chamber creates a bias on said valve means to cause motion of said valve means in one direction and whereby said cam causes motion of said valve means in the opposite direction.

3. In a steam engine of the class described comprising, a valve cylinder having a cover plate at one end, a vacuum chamber in the other end and formed with ports to be controlled, a valve means reciprocable in said cylinder having a valve piston for controlling said ports, a vacuum piston subjected to the vacuum in said vacuum chamber and a rod connecting said pistons, a valve actuating rod passing through said cover plate in connection with said valve piston, a driven member, and means operatively connecting said driven member and the valve actuating rod, whereby vacuum in said vacuum chamber creates a bias on said valve means to cause motion of said valve means in one direction and whereby said driven member causes motion of said valve means in the opposite direction.

CHARLES H. YOUNG.